United States Patent [19]

Steidl et al.

[11] Patent Number: 5,784,969
[45] Date of Patent: Jul. 28, 1998

[54] PROCESS AND DEVICE FOR REGULATING THE EARTH-RELATED INCLINATION OF RAILROAD VEHICLE BOXES

[75] Inventors: Siegbert Steidl, Herzogenaurach; Günter Wagner, Ebermannstadt; Clemens Jungkunz, Erlangen; Herbert Müller, Höchstadt; Bernhard Rath, Gladbeck, all of Germany; Anton Stribersky, Eberschwang, Austria; Peter Drücke; Werner Niemeyer-Stein, both of Bremen, Germany

[73] Assignee: Siemens Aktiengesellschaft, Munich, Germany

[21] Appl. No.: 765,762

[22] PCT Filed: Jun. 30, 1995

[86] PCT No.: PCT/EP95/02548

§ 371 Date: Jun. 18, 1997

§ 102(e) Date: Jun. 18, 1997

[87] PCT Pub. No.: WO96/02027

PCT Pub. Date: Jan. 25, 1996

[30] Foreign Application Priority Data

Jul. 11, 1994 [EP] European Pat. Off. ............ 94110758.3

[51] Int. Cl.$^6$ ............................................. B61F 5/24
[52] U.S. Cl. ............................................. 105/199.2
[58] Field of Search ................... 105/199.2; 280/112.2

[56] References Cited

U.S. PATENT DOCUMENTS

| 3,717,104 | 2/1973 | Law et al. | 105/199.2 |
| 4,440,093 | 4/1984 | Kakehi et al. | 105/199.2 |
| 5,295,443 | 3/1994 | Bangtsson et al. | 105/199.2 |
| 5,454,329 | 10/1995 | Liprandi et al. | 105/199.2 |
| 5,564,342 | 10/1996 | Casetta et al. | 105/199.2 |

FOREIGN PATENT DOCUMENTS

| 0 271 592 | 6/1988 | European Pat. Off. |
| 0 557 893 | 9/1993 | European Pat. Off. |
| 2129472 | 10/1972 | France |
| 1933893 | 2/1970 | Germany |
| 2111133 | 9/1972 | Germany |
| 2705221 | 9/1977 | Germany |
| 442846 | 11/1981 | Sweden |

*Primary Examiner*—S. Joseph Morano
*Attorney, Agent, or Firm*—Kenyon & Kenyon

[57] ABSTRACT

A process and device for controlling the inclination of rail vehicle boxes in a railway vehicle, the rail vehicle boxes sitting on spring-suspended bogies with at least one pair of wheels which can be pivoted about the longitudinal axis. The centrifugal acceleration in the horizontal plane is determined and a setpoint is calculated for the absolute inclination of the box relative to the earth. An actual value of the absolute inclination of the box relative to the earth is determined and at least one control signal is formed from the difference between the setpoint and the actual value of the absolute inclination of the box. The angle between the bogie and the box is adjusted across the direction of travel as a function of the control signal thus formed. This makes it possible to control the inclination of the box independently of the type of track banking design and any possible interference.

9 Claims, 1 Drawing Sheet

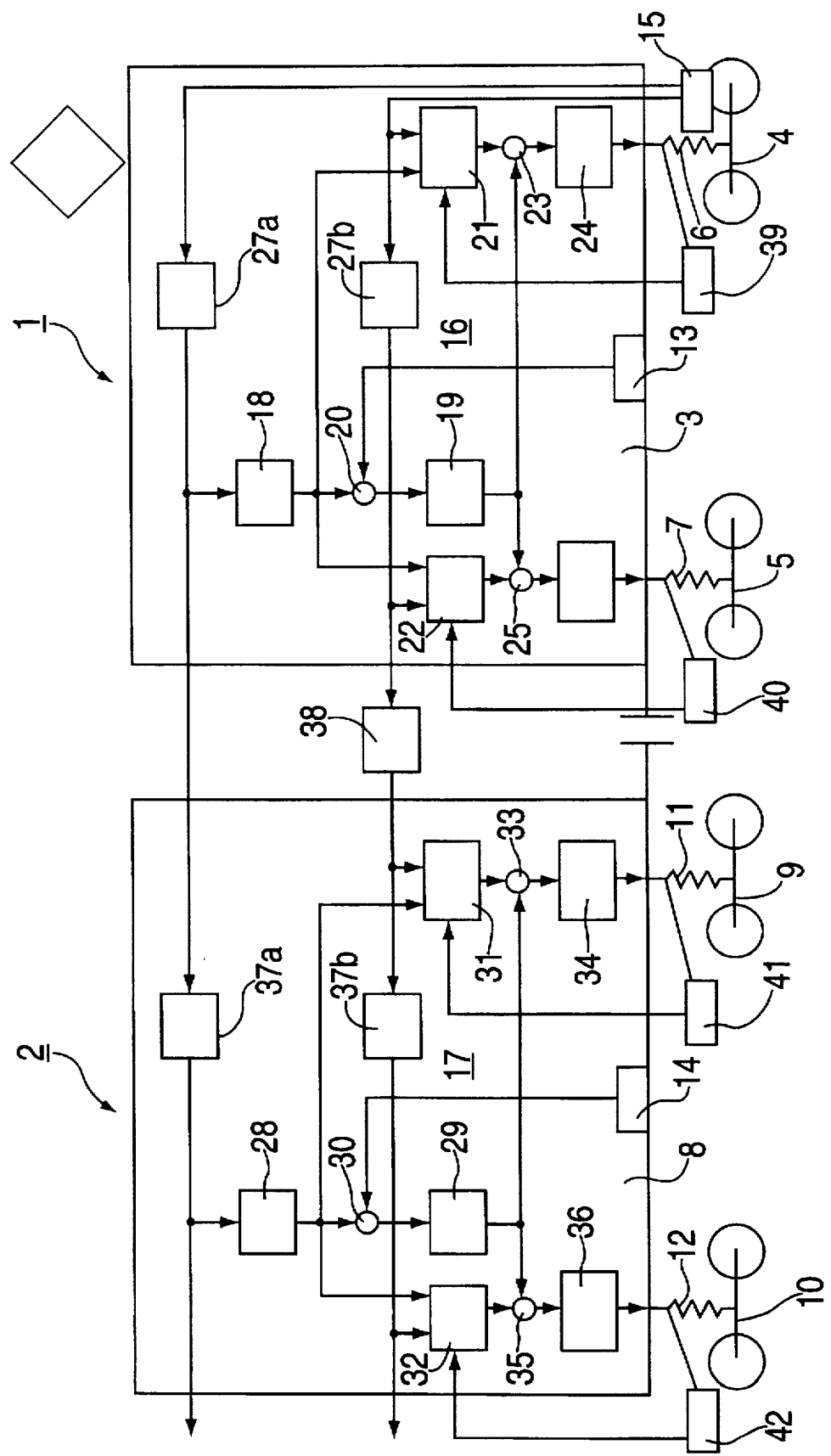

PROCESS AND DEVICE FOR REGULATING THE EARTH-RELATED INCLINATION OF RAILROAD VEHICLE BOXES

FIELD OF THE INVENTION

The present invention relates to a process and device or regulating the earth-related inclination of rail boxes in railway vehicles.

BACKGROUND INFORMATION

When rail vehicles travel on a curve, the centrifugal force acting on the passengers and transported goods causes a transverse acceleration that should be minimized to improve comfort and safety without unnecessarily reducing travel speed at the expense of travel time and shipping capacity at the same time. Because of rising demands, an attempt has been made to supplement railway engineering measures (banking in curves) by measures implemented in the railway vehicle itself. Some of the transverse acceleration acting on the passengers can be neutralized with the help of gravity. European Patent A 557,893 and Swedish Patent B 442,846 disclose methods of controlling the inclination of a rail vehicle box relative to the bogie on which it is supported with the goal of reducing transverse acceleration.

European Patent A 557,893 discloses a system where the inclination of the box relative to the bogie is controlled by regulating the transverse acceleration in the vehicle, which requires a precontrol device to detect a curve in the track by means of centrifugal sensors. Furthermore, an additional setpoint must be defined for the angle between the box and the bogie. In the known case, the quality of the control depends on the precontrol and requires a knowledge of the design of the track curves on which the vehicle is to travel.

Swedish Patent B 442,846 discloses a system where the setpoint of the angle between the box and the bogie is determined from the acceleration values in the engine and from an additional setpoint determined from the angle difference between the front bogie and the rear bogie. This inclination system is based on a certain geometry of the track banking. This system can misinterpret a defect in track banking in a straight line of track as banking in a curve, which would thus result in an unwanted reaction in angle of slope having the wrong plus or minus sign. In addition, the front vehicle unit cannot be regulated optimally because of the long processing times for the acceleration signal.

German Patent A 2,705,221 discloses an arrangement for controlling an inclination device with which the inclination of a box can be adjusted in relation to the bogie of the vehicle. In this arrangement the uncompensated transverse acceleration is controlled by sending to the inclination device a signal representing the difference between the centrifugal acceleration in the horizontal plane, which is weighted with one factor, and the absolute inclination of the box, which is weighted with a different factor.

The arrangement according to German Patent A 2,705,221 is controlled by a process that includes the following steps:
the centrifugal acceleration is determined in the horizontal plane,
a setpoint is formed for the absolute inclination of the box relative to the earth as an inertial system,
the actual value of the absolute inclination of the box relative to the earth as an inertial system is determined,
at least one control signal is formed from the difference between the setpoint and the actual value of the absolute inclination of the box,
the angle between the bogie and the box is adjusted across the direction of travel as a function of the control signal thus formed.

It is thus impossible with the control process disclosed in German Patent A 2,705,221 to freely select a setpoint for the absolute inclination of the box as a function of he travel situation—i.e., not to allow the vehicle to incline below a minimum speed or below minimum curve radii—or to freely design a controller for the absolute angle of inclination which has a significant influence on the uncompensated transverse acceleration.

European Patent A 271,592 discloses a process for regulating the inclination and a device for carrying out this process. In this process, the railway line information is stored in a mass storage device. For each storage section width (e.g., 1 m) the track radius and the banking of the curve must be entered by measuring the track. Thus, the information for each line of track on which the vehicle is to run with regulated inclination must first be compiled in a demanding data acquisition process. The inclination of the vehicle cannot be regulated over routes not included in the mass storage.

German Patent A 1,933,893 discloses a process for regulating the inclination of a vehicle, where the difference between the banking of the track and the plane in which the apparent plumb line runs is regulated to zero. The apparent plumb line is understood to refer to the plumb line to the plane in which no transverse acceleration occurs. Thus, in this process, it is necessary to measure the banking of the track. This measurement requires at least one sensor in the area of the bogie. This sensor is exposed to great dynamic stresses because of its position. The measurement signal has a high noise level. Moreover, this process does not regulate the angle to the horizontal plane, which is important for the passengers, but instead it regulates the angle to the inclined track.

German Patent A 2,111,133 and the corresponding French Patent A 2,129,472 disclose a process and a device for controlling a rail vehicle to conform to a curved track so that curves can be traveled at high speeds. In this process, the pressure difference between the right and left hydraulic lifting cylinders of a vehicle is measured to determine the centrifugal acceleration. This pressure measurement is not used to determine the weight of the rail car.

SUMMARY OF THE INVENTION

An object of the present invention is to provide a process and a device that will ensure that the inclination of a railroad vehicle box can be regulated regardless of the type of banking in the curved track or disturbances such as side winds.

The present invention discloses a process for controlling the earth-related inclination of rail vehicle boxes of a railway vehicle having at least one vehicle whose box sits on bogies with a spring suspension and with at least one pair of wheels and can be pivoted about the longitudinal axis, wherein the process includes the steps of a) determining the centrifugal acceleration in the horizontal plane, b) forming therefrom a setpoint that is freely predefinable as a function of the travel situation for the absolute inclination of the box relative to the earth as an inertial system, c) determining the actual value of the absolute inclination of the box relative to the earth as an inertial system, d) forming at least one control signal from the difference between the setpoint and the actual value of the absolute inclination of the box with the help of a freely preselectable law of formation and e) adjusting the angle between the bogie and the box across the direction of travel as a function of the control signal thus formed.

The present invention also discloses a device which includes a) at least one measurement device provided in the box to determine the centrifugal acceleration in the horizontal plane, b) at least one setpoint generator to form a freely definable setpoint, depending on the travel situation, for the absolute inclination of the box relative to the earth, considered as an inertial system, c) at least one measurement device to measure the actual value of the absolute inclination of the box relative to the earth as an inertial system, d) at least one control device to form at least one control signal from the difference between the setpoint and the actual value of the absolute inclination of the box with the help of a freely selectable law of formation, and at least one adjusting device for adjusting the angle between the bogie and the box across the direction of travel as a function of the control signal thus formed.

In the process of the present invention, the centrifugal acceleration in the horizontal plane is determined first. Then, a setpoint that is freely definable as a function of the travel situation is formed for the absolute inclination of the box relative to the earth as an inertial system. In addition, the actual value of the absolute inclination of the box relative to the earth as an inertial system is determined and at least one control signal is formed from the difference between the setpoint and the actual value of the absolute inclination of the box with the help of a freely selected law of formation. Next, the angle between the bogie and the box is adjusted across the direction of travel as a function of the control signal thus formed.

The solution disclosed by the present invention is based on the finding that a physical quantity that can compensate for the transverse acceleration component due to the curve can be used directly to adjust the inclination of the box. This physical parameter is the angle of inclination of the box with respect to the direction of gravitational force or with respect to the earth's surface, which is assumed to be horizontal.

According to the present invention, this angle of inclination relative to the earth is determined by a measurement device mounted in the box and it is kept at the desired level by a control device.

Thus, the inclination to the horizontal is measured directly by the measurement device in the box as a relevant parameter for the effective transverse acceleration. This permits regulation of the inclination of the box without the circuitous route of intermediate quantities. No additional information is needed regarding the position of the bogie or the design of the track bed. This eliminates the possibility of faulty reactions of the control device in a disturbance, such as may be caused by irregularities in the track or by side winds.

The setpoint for the box inclination is formed from the centrifugal acceleration in the horizontal plane, where the centrifugal acceleration can be determined from the angular velocity about the vertical axis and the traveling speed. The vertical axis preferably runs parallel to the force of gravity. However, it is also possible to use an axis of the rail vehicle that is not perpendicular to the surface of the earth, for example, its vertical axis instead of the earth-referenced vertical axis, to determine the angular velocity. The angular velocity about such an axis must then be converted by transformation of coordinates into an angular velocity about the earth-referenced vertical axis (with a knowledge of the angle between the earth-referenced vertical axis and the vertical axis used for the determination). The sensor for the angular velocity about the vertical axis may be located in a box or bogie located farther forward in the direction of travel, e.g., in the front bogie or box, or in the vehicle itself which is to be inclined.

When using a sensor mounted farther forward in the direction of travel, the already short filter time of the centrifugal sensor can be compensated completely.

As an alternative, the track curvature can be used to determine the centrifugal acceleration, again taking vehicle speed into account. The track curvature is determined in an advantageous manner from the deflection in at least one longitudinal bogie axis with respect to the longitudinal axis of the box.

Due to the fact that the setpoint for the inclination of the box is determined from the centrifugal acceleration in the horizontal plane, the process according to the present invention can reliably differentiate between banking in a curved track and a banking defect in a straight track. Only when traveling on curves does centrifugal acceleration occur whose component in the horizontal is independent of the banking in the track. Such centrifugal acceleration does not occur when traveling over a defect in straight track.

In the process according to the present invention, in contrast with the known process, the track banking is not used to form the setpoint for the absolute inclination of the box with respect to the earth, which is regarded as an inertial system, but when there is a defect in the track resulting from a difference in elevation of the two rails, there is no unwanted inclination of the box. It is admissible to regard the earth as an inertial system due to the physical factors.

Each vehicle is controlled independently, so the control is in principle autonomous.

Another improvement can be achieved in controlling the inclination of the box by determining the inclination of the bogie with respect to the horizontal (actual value) as another process step and then using it together with the absolute inclination of the box (setpoint) that has already been determined from the centrifugal acceleration as a precontrol to adjust the angle between the bogie and the box across the direction of travel. The additional measurement equipment required for this can be accommodated in the bogie. In contrast to known processes in which the angle between the bogie and the box is the controlled variable, the precontrol process of the present invention is also insensitive to track defects. Such a precontrol thus represents a further improvement in the dynamics of the control process and, contrary to known processes, is not used to form the setpoint for the absolute inclination of the box.

Using an inertial sensor technology offers the advantage over independent centrifugal and acceleration sensors so that automatic offset and drift compensation of the centrifugal signals is always assured.

In an advantageous manner, the device can include pressure sensors mounted in the pneumatic springs of the bogie for on-line detection of the box weight. This permits automatic adaptation of the controller parameters to different loading conditions of the box.

BRIEF DESCRIPTION OF THE DRAWINGS

FIG. 1 illustrates an embodiment of a device for carrying out the process of the present invention.

DETAILED DESCRIPTION

FIG. 1 shows a railway vehicle consisting of two vehicles 1 and 2 linked together. The first vehicle 1 is designed as a motor vehicle and is located in front of the second vehicle 2, which is not driven, as seen in the direction of travel. While in the embodiment illustrated in FIG. 1 the first vehicle 1 is driven, the process and device according to the present invention do not depend on whether or not the respective vehicle is driven.

The first vehicle 1 includes a box 3 that is spring-mounted on two bogies 4 and 5 with pneumatic springs 6 and 7 so it can pivot about its longitudinal axis by appropriate suspension means (not shown).

The second vehicle 2 includes a box 8 that is spring-mounted in the same way as box 3 on two bogies 9 and 10 with pneumatic springs 11 and 12.

A measurement device 13 or 14 is mounted in each vehicle 1 or 2. In the embodiment illustrated here, measurement device 13, 14 is mounted in each box 3, 8 and includes a sensor, preferably a centrifugal sensor, for measuring the angular velocity about the vertical axis.

The centrifugal acceleration in the horizontal plane can be determined by measurement device 13. If necessary, the setpoint for the absolute inclination of the box 3 can be formed from the centrifugal acceleration. The setpoints for the absolute inclination of the individual boxes depend on both velocity and track curvature. If vehicle speed is constant, all the boxes receive the same setpoint for their absolute inclination at the moment when they pass over any defined point in the track.

The actual values of the absolute inclination of the boxes 3 and 8 with respect to the earth, which is regarded as an inertial system, are measured by measurement devices 13 and 14.

Furthermore, an additional measurement device 15 is also provided in a bogie 4 of rail car 1 (this is the front bogie as seen in the direction of travel) to determine the actual value of the absolute inclination of the bogie 4 with respect to the earth, which is regarded as an inertial system, and to determine the centrifugal acceleration in the horizontal plane.

The centrifugal acceleration in the horizontal plane is determined in this example by measuring the angular velocity about the earth-fixed vertical axis, preferably by means of centrifugal sensors, taking into account the vehicle velocity.

The additional measurement device 15 need not necessarily be located in the bogie 4. It is also conceivable to locate the additional measurement device farther to the rear, as seen in the direction of travel, e.g., in bogie 9, if no passengers are in vehicle 1 and therefore box 3 need not be inclined or if no additional measurement equipment can be accommodated in bogie 4 for technical reasons.

In the present embodiment, the physical quantities needed to determine the centrifugal acceleration in the horizontal plane are not measured by measurement device 13, but instead by additional measurement device 15. In this context, it is self-evident that the travel speed which is needed for this must be measured at only one location inside the box (e.g., by a speed sensor in the bogie).

In addition, one control device 16 or 17 is provided in each box 3 or 8. For the first vehicle 1, control device 16 includes a setpoint generator 18 and a controller 19 in the present embodiment.

Setpoint generator 18 forms a setpoint depending on the driving situation for the absolute inclination of box 3 relative to the earth as an inertial system, taking into account an upper limit for the transverse acceleration in the plane of the box.

Using the actual value measured by measurement device 13 and the setpoint formed by setpoint generator 18 for the absolute inclination of the box, a subtractor forms a differential signal that is sent to controller 19.

The actual value of the absolute inclination determined by the additional measurement device 15 is also sent to a precontrol device 21 and to a precontrol device 22. Precontrol device 21 is assigned to bogie 4 and precontrol device 22 is assigned to bogie 5. In addition, the setpoint for the absolute inclination of box 3 formed by setpoint generator 18 is sent to precontrol devices 21 and 22.

The control signal formed in controller 19 is sent to an adder 23 together with the precontrol signal formed in precontrol device 21. From the control signal and the precontrol signal, adder 23 forms a summation signal that is then sent to an adjusting device 24 for bogie 4.

At the same time the control signal formed in controller 19 is sent to an adder 25 together with the precontrol signal formed in precontrol device 22. Adder 25 also forms a summation signal from the control signal and the precontrol signal and sends it to an adjusting device 26 for bogie 5.

Controller 19 always acts on adjusting devices 24 and 26 by way of adder 23 or 25 and is relieved by the precontrol device 21 and 22. If the precontrol by precontrol devices 21 and 22 is already good enough, a low control signal is additively superimposed on the precontrol signal by controller 19. Thus, the precontrol devices 21 and 22 provided in an especially advantageous embodiment yield a further improvement in the dynamics in the control process according to the present invention.

To take into account the vehicle speed and the design factors in the vehicle 1, such as the distance between measurement device 13 and the additional measurement device 15 (which is half the center-to-center distance between the two bogies 4 and 5 in the present example), the signals of the additional measurement device 15 are sent to setpoint generator 18 via a delay element 27a and to precontrol device 22 via delay element 27b.

The output signals of the additional measurement device 15 (with a time delay in delay elements 27a, 27b) are relayed to control device 17 of the second vehicle 2.

Control device 17 in the second box 8 also includes a setpoint generator and a controller, where the setpoint generator is labeled as 28 and the controller as 29.

Subtractor 30 forms a differential signal from the actual value measured by measurement device 14 and the setpoint for the absolute inclination of the box 8 formed by setpoint generator 28 of control device 17 and sends it to controller 29.

The actual value of the absolute inclination of bogie 4 relative to earth (determined by the additional measurement device 15) is sent to a precontrol device 31 and a precontrol device 32. Precontrol device 31 is assigned to bogie 9 and precontrol device 32 is assigned to bogie 10. In addition, the setpoint for the absolute inclination of box 8 formed by setpoint generator 28 is also sent to precontrol devices 31 and 32.

The control signal formed in controller 29 is sent to an adder 33 together with the precontrol signal formed in precontrol device 31. From the control signal and the precontrol signal, the adder forms a summation signal that is sent to an adjusting device 34 for the bogie 9.

At the same time, the control signal formed in controller 29 is sent together with the precontrol signal formed in precontrol device 32 to an adder 35. Adder 35 also forms a summation signal from the control signal and the precontrol signal and sends it to an adjusting device 36 for bogie 10.

Controller 29 always acts on adjusting device 34 or 36 via adder 33 or 35 and the burden on the controller is relieved by precontrol devices 31 and 32. If the precontrol by precontrol devices 31 and 32 is good enough, a low control signal is superimposed additively on the precontrol signal by controller 29.

To also take into account the vehicle speed and the design factors such as the center-to-center distance of bogies 9 and 10 relative to each other in the second vehicle 2, the output signals of the additional measurement device 15 that have already been delayed in delay element 27a or 27b are delayed again. The output signal supplied to setpoint generator 28 is delayed via delay element 37a. The output signal sent to precontrol devices 31 and 32 is first delayed via delay element 38 and then sent to precontrol device 31. At the same time, this signal is sent again to precontrol device 32 via a delay element 37b. Delay element 37a takes into account the distance between the two measurement devices 13 and 14, whereas delay element 37b takes into account the center-to-center distance between the two bogies 9 and 10.

The center-to-center distance between the front bogie 9 of the second vehicle 2 and the rear bogie 5 of the first vehicle 1 is taken into account by delay element 38.

The vehicle speed is taken into account in all delay elements (delay elements 27a and 27b in box 3, delay elements 37a and 37b in box 8 and delay element 38).

In the embodiment illustrated here, pressure sensors 39 through 42 are provided in pneumatic springs 6 and 7 as well as 11 and 12 of bogies 4 and 5 or 9 and 10. This provides on-line detection of the weight of the two loaded rail cars 1 and 2, which thus permits automatic adjustment of the controller parameters to variable loading states of the two cars 1 and 2.

We claim:

1. A process for controlling the earth-related inclination of a rail vehicle box of a railway vehicle having at least one rail vehicle box which sits on bogies, each bogie having a spring suspension and at least one pair of wheels and being pivotable about a longitudinal axis of the bogie, the process including the steps of:
   a) determining a centrifugal acceleration in a horizontal plane;
   b) determining from the centrifugal acceleration a setpoint for an absolute inclination of the rail vehicle box relative to the earth, the setpoint being freely predefinable as a function of travel conditions;
   c) determining an actual value of the absolute inclination of the rail vehicle box relative to the earth;
   d) generating at least one control signal from a difference between the setpoint and the actual value of the absolute inclination of the rail vehicle box using a freely preselectable law of formation; and
   e) adjusting the angle between the bogie and the rail vehicle box across the direction of travel of the rail vehicle box as a function of the at least one control signal,
   wherein the centrifugal acceleration is determined as a function of physical quantities measured in front of the rail vehicle box.

2. A process for controlling the earth-related inclination of a rail vehicle box of a railway vehicle having at least one rail vehicle box which sits on bogies, each bogie having a spring suspension and at least one pair of wheels and being pivotable about a longitudinal axis of the bogie, the process including the steps of:
   a) determining a centrifugal acceleration in a horizontal plane;
   b) determining from the centrifugal acceleration a setpoint for an absolute inclination of the rail vehicle box relative to the earth, the setpoint being freely predefinable as a function of travel conditions;
   c) determining an actual value of the absolute inclination of the rail vehicle box relative to the earth;
   d) generating at least one control signal from a difference between the setpoint and the actual value of the absolute inclination of the rail vehicle box using a freely preselectable law of formation; and
   e) adjusting the angle between the bogie and the rail vehicle box across the direction of travel of the rail vehicle box as a function of the at least one control signal,
   wherein the absolute inclination of the bogie relative to the earth is measured and a control signal for adjusting the angle between the bogie and the rail vehicle box across the direction of travel is formed from a difference between a track banking and the setpoint for the absolute inclination of the box relative to the earth.

3. The process of claim 2 wherein the control signal for adjusting the angle between the bogie and the box across the direction of travel is generated as a function of the absolute inclinations of all bogies of the railway vehicle and a predefinable upper limit for the torsion of the rail vehicle box about its longitudinal axis.

4. A process for controlling the earth-related inclination of a rail vehicle box of a railway vehicle having at least one rail vehicle box which sits on bogies, each bogie having a spring suspension and at least one pair of wheels and being pivotable about a longitudinal axis of the bogie, the process including the steps of:
   a) determining a centrifugal acceleration in a horizontal plane;
   b) determining from the centrifugal acceleration a setpoint for an absolute inclination of the rail vehicle box relative to the earth, the setpoint being freely predefinable as a function of travel conditions;
   c) determining an actual value of the absolute inclination of the rail vehicle box relative to the earth;
   d) generating at least one control signal from a difference between the setpoint and the actual value of the absolute inclination of the rail vehicle box using a freely preselectable law of formation; and
   e) adjusting the angle between the bogie and the rail vehicle box across the direction of travel of the rail vehicle box as a function of the at least one control
   wherein the absolute inclination of the bogie relative to the earth is measured in front of the rail vehicle box.

5. A device for controlling the earth-related inclination of a rail vehicle box of a railway vehicle having at least one rail vehicle box which sits on bogies, each bogie having a spring suspension and at least one pair of wheels and being pivotable about a longitudinal axis of the bogie, the device comprising:
   a) an acceleration measurement device provided in the rail vehicle box to determine a centrifugal acceleration in a horizontal plane;
   b) a setpoint generator to generate a freely definable setpoint for an absolute inclination of the rail vehicle box relative to the earth, the setpoint being generated in accordance with travel conditions;
   c) an inclination measurement device to measure an actual value of the absolute inclination of the box relative to the earth;

d) a control device which generates at least one control signal from a difference between the setpoint and the actual value of the absolute inclination of the box, wherein the control device generates the at least one control signal in accordance with a freely selectable law of formation; and e) an adjusting device for adjusting an angle between the bogies and the rail vehicle box across the direction of travel as a function of the at least one control signal, wherein the acceleration measurement device is located in front of the rail vehicle box, and wherein the device includes signal relaying means for relaying to the rail vehicle box a signal indicative of at least one quantity measured by the acceleration measurement device.

6. A device for controlling the earth-related inclination of a rail vehicle box of a railway vehicle having at least one rail vehicle box which sits on bogies, each bogie having a spring suspension and at least one pair of wheels and being pivotable about a longitudinal axis of the bogie, the device comprising:

a) an acceleration measurement device provided in the rail vehicle box to determine a centrifugal acceleration in a horizontal plane;

b) a setpoint generator to generate a freely definable setpoint for an absolute inclination of the rail vehicle box relative to the earth, the setpoint being generated in accordance with travel conditions:

c) an inclination measurement device to measure an actual value of the absolute inclination of the box relative to the earth;

d) a control device which generates at least one control signal from a difference between the setpoint and the actual value of the absolute inclination of the box, wherein the control device generates the at least one control signal in accordance with a freely selectable law of formation; and e) an adjusting device for adjusting an angle between the bogies and the rail vehicle box across the direction of travel as a function of the at least one control signal, wherein an additional measurement device is provided in the bogie by means of which an actual value of an absolute earth-referenced inclination of the bogie can be measured, and wherein in the control device at least one control signal is formed from a difference between a track banking and a setpoint of the absolute inclination of the rail vehicle box relative to earth for adjusting the angle between the bogie and the rail vehicle box across the direction of travel.

7. The device of claim 6, wherein the additional measurement device is arranged in front of the rail vehicle box, and wherein the device includes signal relaying means for relaying to the rail vehicle box a signal indicative of the absolute measured inclination of the bogie relative to earth.

8. The device of claim 6, wherein the additional measurement device measures at least one physical quantity needed to determine the centrifugal acceleration.

9. A device for controlling the earth-related inclination of a rail vehicle box of a railway vehicle having at least one rail vehicle box which sits on bogies, each bogie having a spring suspension and at least one pair of wheels and being pivotable about a longitudinal axis of the bogie, the device comprising:

a) an acceleration measurement device provided in the rail vehicle box to determine a centrifugal acceleration in a horizontal plane;

b) a setpoint generator to generate a freely definable setpoint for an absolute inclination of the rail vehicle box relative to the earth, the setpoint being generated in accordance with travel conditions;

c) an inclination measurement device to measure an actual value of the absolute inclination of the box relative to the earth;

d) a control device which generates at least one control signal from a difference between the setpoint and the actual value of the absolute inclination of the box, wherein the control device generates the at least one control signal in accordance with a freely selectable law of formation; and e) an adjusting device for adjusting an angle between the bogies and the rail vehicle box across the direction of travel as a function of the at least one control signal, wherein pressure sensors are mounted in springs of the bogie.

* * * * *